Sept. 7, 1965               J. GROSS               3,205,114
HEAT SEALING AND VACUUM OPERATED DIE CUTTING DEVICE
Filed Jan. 26, 1962
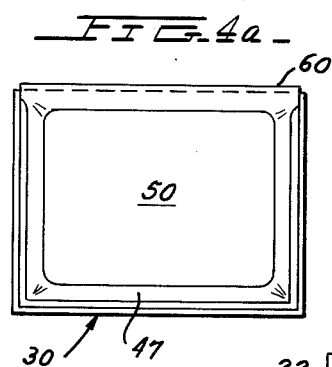
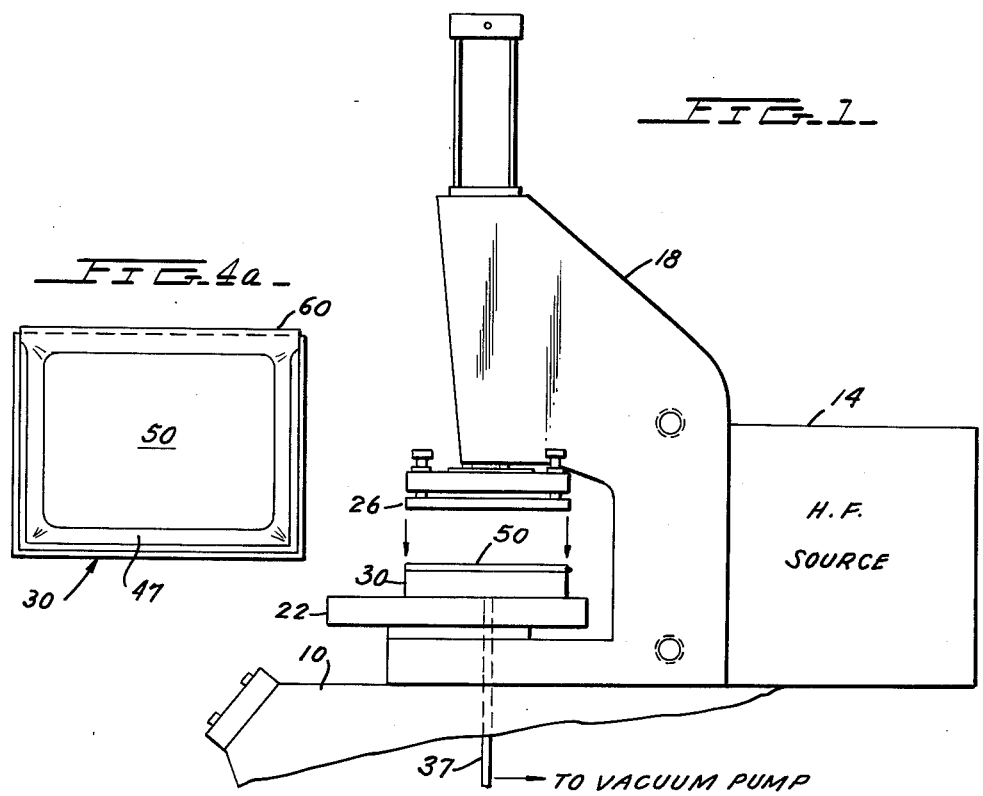
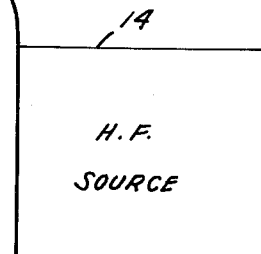
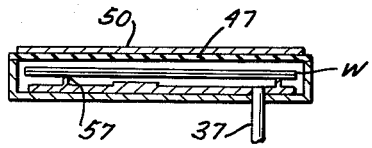
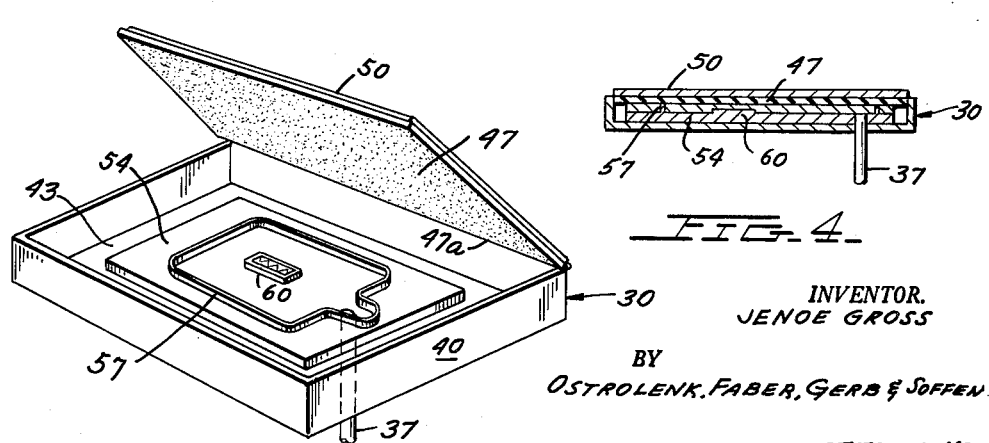
INVENTOR.
JENOE GROSS
BY
OSTROLENK, FABER, GERB & SOFFEN
ATTORNEYS United States Patent Office 3,205,114
Patented Sept. 7, 1965

3,205,114
HEAT SEALING AND VACUUM OPERATED
DIE CUTTING DEVICE
Jenoe Gross, Brooklyn, N.Y., assignor to Sealomatic
Electronics Corp., Brooklyn, N.Y., a corporation of
New York
Filed Jan. 26, 1962, Ser. No. 169,042
4 Claims. (Cl. 156—380)

This invention relates to heat sealing machines and more particularly to a machine wherein high frequency heat is utilized, as effected by a pair of electrode plates between which the work is sealed.

It is an object of the invention to provide a device wherein work comprising a heat sealable plastic material may be placed and wherein in the course of a single operation dielectric heat may be introduced and the work die cut in a desired configuration.

It is another object of the invention to provide a device which is rugged in construction and economical to manufacture and requiring no precision machining or expensive components.

It is an additional object of the invention to provide a device which can be used in conjunction with standard heat sealing machines in coaction with the usual platens thereof.

Other objects and features of the invention will be apparent from the description given hereinafter.

Briefly, my invention comprises a box-like container having metallic top and bottom surfaces between which a high frequency electromagnetic field may be effective and wherein materials placed within such casing or housing will be heated in a well known manner, certain contiguous surfaces or edges of a plurality of materials being thus heat sealed to each other. For example, if within such housing a pair of sheets of heat sealable plastic material be placed from which it is intended to make a bag by heat sealing around the peripheral contour of such sheets in a particular configuration, the housing, on its floor, would be provided with a cutting die of such configuration and the sheets would be laid in contiguity with each other on the die. The top wall of the housing would comprise a flexible sheet, to the end that if vacuum be introduced into the housing, the flexible sheet would be drawn down against the material forcing it into cutting engagement with the edge of the die, such die being in the nature of an ordinary steel rule die. Simultaneously, dielectric heating due to the electromagnetic field between the top and bottom metallic elements of the housing would cause fusion of the material sheets to each other around the contour of the die. In other words, the sheets would be forced against each other and sandwiched between the flexible wall and the steel rule cutting edge so that as a simultaneous operation a sealed contour of the particular type desired would be effected and the contour cut out thus achieving a completed article. The waste material would thus be removed at the time the housing is opened, along with the finished product. It is also possible in the practice of the invention to provide an ornamental plate or mold within the housing, for example, within the confines of the cutting die so that as the flexible wall is forced by evacuation of the housing against the sheets, the dielectric heating effect causes an impression of the ornamental mold surface to be impressed on the material of the work.

A detailed description of the invention will now be given in conjunction with the appended drawing in which:

FIGURE 1 shows generally a side view of what may be considered to be a conventional heat sealing machine;

FIGURE 2 shows a perspective view of the invention in the form of a closable device to be inserted between the platens of the machine of FIGURE 1;

FIGURE 3 is an elevation in cross-section through the device showing the position of the various components prior to evacuation of the housing; and FIGURE 4 is the same elevation but showing the condition of the components after evacaution of the housing.

Referring now to the drawing, and more particularly to FIGURE 1, a machine of the dielectric heating type is shown and such machine, for the purposes of the present invention, may be considered to be of generally conventional construction. Thus, the machine comprises a base 10 a source of high frequency energy 14, shown generally as a casing, which will be assumed to contain all the electronic equipment necessary, a frame 18, a plate 22, an upper platen 26. High frequency energy will be understood to be fed to the platens 22 and 26 in the usual manner. Carried on the platen 22 is the device which constitutes the present invention and which comprises a housing 30 against which the upper platen 26 will be understood to be brought by movement of such platen in a downward direction, as indicated by the arrows, and into contact with a metallic plate 50 which forms the top wall of the housing 30. Connected to the housing 30 is a vacuum line 37 which is understood to be connected to a vacuum pump (not shown).

Referring now to FIGURE 2, the housing 30 is shown as comprising a generally rectangular box having side walls such as 40 and a bottom wall 43. The side walls and bottom wall may be comprised of an integral sheet of metal suitably formed to effect the housing. The top closure for the housing comprises a flexible sheet of rubber 47 or other suitable flexible insulating material, to the top surface of which is suitably secured a metallic plate 50 which forms the upper electrode of the housing with reference to the bottom wall 43, the lower electrode. Alternately, a type of conductive rubber sheet may be used, eliminating plate 50, the rubber thus serving is an electrode as well as a function described below. It will, of course, be understood that the electrode plates 43 and 50 must be insulated from each other since a high frequency electromagnetic field must be induced between the two. Likewise, it will be understood that the flexible wall 47 must be free to be drawn inwardly into the housing when vacuum is applied to the line 37. Various expedients may be utilized in order to produce such coaction. For example, the edge 47a of the rubber sheet may be fastened as by cementing or suitable riveting to the rear wall of the housing 30. The plate 50 would then be, as shown, somewhat smaller in dimensions than the inside dimensions of the housing and would be cemented at one edge only for a suitable marginal distance to the rubber sheet. Thus, when, as shown in FIGURES 3 and 4, the rubber sheet is brought down to cover the upper edges of the vertical walls, the metal electrode plate 50 would simply ride on the rubber sheet but would not touch any of the metal of the vertical walls. Accordingly, the casing 30 could be opened or closed simply by swinging the metal sheet upwardly or downwardly. While the above construction may be utilized in order to provide a completely integral housing and cover arrangement, it will of course be understood that the plate 50 may be an entirely separate piece. It will likewise be understood that suitable hinges made of insulated material, such as hard plastic, may be utilized between the plate 50 and the rear vertical wall of the housing 30. Such construction has not been shown but will be understood to be merely one of a number of ways to provide accessability to the interior of the housing 30, wherein any one of several arrangements may be devised, all in accordance with the skill of persons in this field.

Inside the housing 30 and on the floor thereof there is a plate 54, this being a die plate which carries the steel rule die 57 shown generally as being in a desired type of contour for a particular article or object to be manufactured. Carried on plate 57 may be an ornamental mold such as 60. The tube 37 extends through a suitable aperture in the plate 54 so as to evacuate the interior or the region within the confines of the enclosure. A pair of heat sealable plastic sheets designated as W, to be formed as a bag are shown stretched across the cutting edge of the die 57. Thereafter the housing is closed by bringing the rubber blanket down against the upper edges of the vertical walls, and subsequently high frequency energy is applied. At that time suction is applied and the rubber sheet 47 will be drawn down against the work as shown in FIGURE 4, to effect cutting of the bag contour against the die, the metal plate 50 following the rubber sheet. Thus, high frequency heat between the two plates will effect a sealing around the contour of the die by virtue of the strong pressure brought against the work which is pressed against the die face. At the same time the ornamental material on the ornamental mold 60 is likewise impressed on the lower sheet of the work. It is contemplated that the rubber sheet will be of sufficient thickness and physical characteristics that it will seal itself around the interior surfaces of the vertical walls 40 as it is drawn into the housing. Such sealing effect is shown generally in FIGURE 2 wherein it is seen that the edge 47a of the rubber sheet is fastened by being folded over and cemented to the rear wall of the housing whereas the other three edges of the rubber sheet are free to be drawn into the housing and to be curled upwardly so as to effect a sufficient seal for purposes of achieving enough of a vacuum to effect the necessary force of the rubber sheet against the work in pressing the work into cutting relation with the die. It will, of course, be recognized that other expedients could be utilized, for example, the rubber sheet might be a separate piece entirely and simply placed on the upper edges of the vertical walls of the casing, and then a framing placed therearound clamping it to such upper edges, in accordance with conventional vacuum molding procedure.

In some cases, it may be desirable to provide air flow holes through the vertical walls of cutting die 57.

It is contemplated that as the rubber sheet is drawn downwardly and carries the plate 50 with it, the platen 26 will follow the plate 50 and maintain contact therewith. However, this is not considered to be essentially the only arrangement in which the principle of the invention could be used. For example, the plate 50 could be connected by a flexible pigtail 2 (not shown) to the plate which holds the platen 26, so that the platen 26 would then be eliminated and the plate 50 would then become the upper electrode platen for the machine.

Having thus described my invention, I am aware that various changes may be made without departing from the spirit thereof and therefore do not seek to be limited to the precise illustration herein given, except as set forth in the appended claims.

I claim:
1. A heat sealing and work cutting device for use in a heat sealing machine of the dielectric heating type, said device comprising a housing having conductive top and bottom walls, and means whereby said walls have relative movement with respect to each other, said housing being substantially air-sealed, a cutting die within said housing, and means for effecting a vacuum connection to the interior of said housing to effect relative movement of said walls toward each other.

2. A device as set forth in claim 1, said bottom wall being fixed, said top wall comprising a flexible conductive sheet.

3. A device as set forth in claim 1, said bottom wall being fixed, said top wall comprising a flexible rubber-like sheet having peripheral sealing engagement with said housing.

4. A device as set forth in claim 3, and a metal electrode plate carried by said sheet on the exterior thereof and in non-conductive relation with said bottom wall.

References Cited by the Examiner
UNITED STATES PATENTS

| | | | |
|---|---|---|---|
| 2,429,122 | 10/47 | Crowley | 156—285 |
| 2,758,631 | 8/56 | Peterson et al. | 156—380 |
| 2,957,513 | 10/60 | Schneider et al. | 156—515 |
| 2,988,129 | 6/61 | Kevelin et al. | 156—273 |
| 3,026,233 | 3/62 | Scholl et al. | 156—515 |
| 3,028,576 | 4/62 | Gerard | 156—251 |
| 3,124,807 | 3/64 | Frenkel et al. | 156—285 |

ALEXANDER WYMAN, *Primary Examiner.*

HAROLD ANSHER, *Examiner.*